United States Patent
Leitner et al.

(10) Patent No.: US 12,278,863 B2
(45) Date of Patent: Apr. 15, 2025

(54) GATEWAY FOR CONNECTION TO A HOST PROCESSOR AND MULTIPLE SLAVES AND METHOD FOR OPERATING THE GATEWAY

(71) Applicant: Elmos Semiconductor SE, Dortmund (DE)

(72) Inventors: Thomas Leitner, Dortmund (DE); Jens Voigt, Dortmund (DE); Michael Küttner, Dortmund (DE)

(73) Assignee: Elmos Semiconductor SE, Dortmund (DE)

( * ) Notice: Subject to any disclaimer, the term of this patent is extended or adjusted under 35 U.S.C. 154(b) by 0 days.

(21) Appl. No.: 18/485,892

(22) Filed: Oct. 12, 2023

(65) Prior Publication Data
US 2024/0129364 A1  Apr. 18, 2024

(30) Foreign Application Priority Data

Oct. 14, 2022 (DE) ...................... 10 2022 210 908.2
Oct. 14, 2022 (DE) ...................... 10 2022 210 909.0

(51) Int. Cl.
*G06F 15/16* (2006.01)
*H04L 12/46* (2006.01)
(Continued)

(52) U.S. Cl.
CPC .......... *H04L 67/1044* (2013.01); *H04L 12/46* (2013.01); *H04W 72/25* (2023.01);
(Continued)

(58) Field of Classification Search
CPC .... H04L 67/1044; H04L 12/46; H04W 72/25; H04W 88/16; H04W 84/005; H04W 84/20
See application file for complete search history.

(56) References Cited

U.S. PATENT DOCUMENTS 6,484,082 B1 * 11/2002 Millsap ............... H04L 12/4035
                                                            701/32.7
8,448,035 B2    5/2013 Yamamoto et al.
(Continued)

FOREIGN PATENT DOCUMENTS

CN         115139944 A    10/2022
DE    10 2005 048 585 A1    4/2007
(Continued)

OTHER PUBLICATIONS

Office Action issued in DE 10 2022 210 908.2 , to which this application claims priority, mailed Jul. 25, 2023 (English-language machine translation attached).
(Continued)

*Primary Examiner* — Normin Abedin
(74) *Attorney, Agent, or Firm* — Tautz & Schuhmacher LLC; Michael McCandlish; Georg Hasselmann (57) ABSTRACT

A gateway for connection to a host processor and multiple slaves, which are organized in a point-to-point (P2P) topology, is provided. The gateway has an independent channel for each of the slaves, and the gateway can receive multiple control signals, each including at least one control signal for a particular predetermined slave from the multiple slaves, from the host processor. The host processor determines whether the slaves for which the at least one control signal has been received are in an operational state; and to simultaneously output the control signals received from the host processor to the slaves for which the at least one control signal has been received only when all of the slaves for which the at least one control signal has been received are in the operational state.

6 Claims, 4 Drawing Sheets

(51) Int. Cl.
*H04L 67/104* (2022.01)
*H04W 72/25* (2023.01)
*H04W 88/16* (2009.01)
*H04W 84/00* (2009.01)
*H04W 84/20* (2009.01)

(52) U.S. Cl.
CPC .......... *H04W 88/16* (2013.01); *H04W 84/005* (2013.01); *H04W 84/20* (2013.01)

(56) References Cited

U.S. PATENT DOCUMENTS

| | | |
|---|---|---|
| 8,792,508 B2 | 7/2014 | Ihle et al. |
| 10,528,423 B2 | 1/2020 | Lam et al. |
| 2013/0145482 A1* | 6/2013 | Ricci ................. G07C 5/02 726/28 |
| 2016/0373533 A1 | 12/2016 | Biswas et al. |
| 2017/0154001 A1 | 6/2017 | Filser et al. |
| 2021/0392012 A1 | 12/2021 | Zinner |
| 2021/0400787 A1 | 12/2021 | Abbo et al. |
| 2022/0315025 A1* | 10/2022 | Kato ................. B60W 50/0098 |

FOREIGN PATENT DOCUMENTS

| | | |
|---|---|---|
| DE | 11 2008 001 599 T5 | 4/2010 |
| DE | 10 2016 123 247 A1 | 6/2017 |
| DE | 10 2017 208 522 A1 | 11/2018 |
| DE | 10 2018 219 246 A1 | 5/2020 |
| DE | 10 2019 215 568 A1 | 4/2021 |
| EP | 3 333 709 A1 | 6/2018 |

OTHER PUBLICATIONS

Office Action issued in DE 10 2022 210 909.0 , to which this application claims priority, mailed Jul. 28, 2023 (English-language machine translation attached).

Decision to grant German patent DE 10 2022 210 909.0, to which this application claims priority, mailed Nov. 28, 2023 and English-language machine translation thereof.

Office Action issued in DE 10 2022 210 908.2, to which this application claims priority, mailed Oct. 10, 2023 and English-language machine translation thereof.

Search Report issued in EP 4 354 808, which is a counterpart hereof, mailed Mar. 11, 2024 and English-language machine translation thereof.

Office Action issued in CN202311327730.8, which is a counterpart hereof, mailed Jul. 19, 2024 and English-language machine translation thereof.

Office Action issued in CN202311327730.8, which is a counterpart hereof, mailed Feb. 9, 2025 and English-language machine translation thereof.

* cited by examiner

GATEWAY FOR CONNECTION TO A HOST PROCESSOR AND MULTIPLE SLAVES AND METHOD FOR OPERATING THE GATEWAY

CROSS REFERENCE TO RELATED APPLICATIONS

This application claims priority to German patent applications DE 10 2022 210 908.2 and DE 10 2022 210 909.0 filed on Oct. 14, 2022, both of which are hereby incorporated by reference in their entireties.

TECHNICAL FIELD

The present disclosure relates to a gateway for connection to a host processor and multiple slaves or responders, optionally of a motor vehicle, and to a method for operating the gateway. Further, a system for data processing having the gateway is provided. Additionally or alternatively, a computer program comprising commands that, when the program is executed by a computer, cause the computer to carry out at least part of the method is provided. Additionally or alternatively, a computer-readable medium comprising commands that, when the commands are executed by a computer, cause the computer to carry out at least part of the method is provided.

BACKGROUND

DE 10 2019 215 568 A1 relates to a method for operating a gateway of a vehicle, in which a control unit of a vehicle connected to a gateway of the vehicle transmits an identifier of the control unit during any communication and the gateway receives the identifier transmitted by the control unit, and to a gateway for a vehicle, a control unit for a vehicle and a vehicle.

DE 11 2008 001 599 T5 relates to a communication system for a vehicle, having a plurality of communication units for a vehicle that are installed in the vehicle and perform a data transmission, wherein the communication apparatus for a vehicle has transmission means for sending an acknowledgement of receipt that inform a transmitter of the data about receipt of the data when the data have been received; and wherein, if there are data to be sent to the transmitter, these data are added to the acknowledgement of receipt and sent to the transmitter together with the acknowledgement of receipt.

What is known as the DSI3 standard is used in motor vehicles. DSI3 can be understood to mean the 3rd-generation Distributed Systems Interface. The standard defines the bus topologies, operating modes and functional classes of DSI3 bus systems and the associated electrical and physical characteristics. Furthermore, the standard also defines the message protocol, message transaction models, message formats, the bit transmission order and message error checking.

DSI3 is a third-generation satellite interface bus primarily intended for safety-critical communication between a central master interface and multiple satellite nodes, also called slaves. Slave nodes can be implemented as simple state machines or as microprocessor- or DSP-based controllers. The slaves can provide raw data signal sources or preprocessed signal sources. Each slave can contain a single data source or multiple data sources. Slave nodes can also provide output and control functions.

The DSI3 protocol manages the formation of networks consisting of a master node and one or more slave nodes. A system can consist of one or more master nodes. The communication between the master and the slaves is based on a command and response transaction model with a separate command and response phase. The connection between a master node and one or more slave nodes is defined by a bus topology. The DSI3 protocol defines point-to-point, serial daisy-chain and parallel bus topologies.

The point-to-point topology (P2P topology) consists of a single master node and a single slave node. In other words, a specific slave node is assigned to only one specific master node, and vice versa. Information or data interchanged between this master node and the associated slave node therefore cannot be seen or received by other master nodes and other slave nodes, in contrast to the daisy-chain bus topology and parallel bus topology. The connection between the master node and the slave node can be referred to as a private line.

In time-critical systems, such as e.g. ultrasonic systems, in which multiple slaves, e.g. USP sensors, are supposed to carry out a specific action, e.g. transmit an ultrasonic pulse, in a synchronized manner, i.e. essentially at the same time, the P2P topology leads to challenges.

In detail: a distance measurement involves a time-of-flight measurement for an ultrasonic signal that is broadcast or transmitted by a USPA sensor. An ultrasonic system has multiple such sensors, and so multiple ultrasonic signals are transmitted for one distance measurement. The reflections of the ultrasonic signals are detected and evaluated by all of the sensors. For a distance measurement to be reasonably possible, it is therefore necessary for the ultrasonic signals from all of the sensors to be transmitted essentially at the same time. In conventional systems, this is achieved by using a daisy-chain or parallel bus topology, which means that a control signal transmitted by the master that causes the sensors or slaves to output the ultrasonic signal is received by all of the slaves essentially at the same time. If the slaves have essentially the same latency, each slave outputs the ultrasonic signal essentially at the same time. As explained above, this is not possible with a P2P topology, however, since the individual slaves are assigned to individual master nodes, and so output of a single signal from the master to the slaves does not achieve time synchronization for the slaves.

SUMMARY

It is an object of the present disclosure to specify an apparatus and a method that are each suitable for enriching the related art.

The object is achieved by the features of the independent claim. The coordinate claims and the subclaims contain optional developments of the disclosure.

Accordingly, the object is achieved by a gateway for connection to a host processor and multiple slaves, the gateway and the slaves being organized in a P2P topology, with the result that the gateway has an independent channel for each of the slaves. The gateway is designed to receive multiple control signals, each comprising at least one control signal for a particular predetermined slave from the multiple slaves, from the host processor, to determine whether the slaves for which the at least one control signal has been received are in an operational state, and to simultaneously output the control signals received from the host processor to the slaves for which the at least one control signal has been received only when all of the slaves for which the at least one control signal has been received are in the operational state.

A gateway can be understood to mean a component (comprising hardware and/or software) that makes a connection between two systems or communication buses. The gateway is thus the bridge for communication between a single or multiple host processor(s) and multiple slaves.

In the present case, the host processor is connected to multiple slaves, optionally sensors (e.g. ultrasonic sensors), via the gateway. In automotive engineering, such gateways can often be found between the different data buses. For certain purposes (e.g. diagnosis and/or control), some data are also made available on the respective other bus. For this purpose, the gateway "copies" the data from one bus to the other.

As already implied by the term gateway, the gateway is thus a component that is designed to convert data received from the host processor according to a first communication standard (e.g. SPI) into a second communication standard (e.g. DSI3), which is different from the first communication standard, and to output the data to the slaves, and/or to convert data received from the slaves according to the second communication standard into the first communication standard and to output the data to the host processor by means of the first communication standard. Reference is furthermore made to the introductory comments relating to the gateway in the acknowledgement of the related art, which can be applied here mutatis mutandis, or analogously.

The gateway may act as a separate control unit or may be part of an existing, larger control unit that can attend to connections to different or other bus variants.

The gateway may be an integrated circuit (IC for short) or the gateway may have such an integrated circuit. An IC can be understood to mean an electronic circuit mounted on an optionally thin, e.g. a few millimeters thick, wafer made from semiconductor material. The circuit is sometimes also referred to as a solid-state circuit or monolithic integrated circuit. This chip (die) is usually encapsulated in a chip package that is several times larger, for the purpose of protection and to facilitate contact-connection. The IC may have a combination of numerous electrically interconnected electronic semiconductor components, such as transistors, diodes and/or other active and passive components.

It is conceivable for the slaves to be ultrasonic sensors (optionally embodied as transceivers) and for the control signals to be designed to cause the respective ultrasonic sensors to output an ultrasonic signal as soon as the control signals are received at the respective ultrasonic sensor.

The gateway described above permits multiple slaves, e.g. ultrasonic sensors, in time-critical systems, such as e.g. ultrasonic systems, to be synchronized even when a P2P (bus) topology is used, since temporary storage of control signals provides an opportunity to initially wait until all of the control signals have arrived in the gateway and then to simultaneously output the control signals to the slaves that are already in the operational state, which means that there is no longer asynchronous behavior even on the part of the slave.

Possible developments of the data processing apparatus described above are explained in detail below. All of these developments, alone or in combination, strengthen the advantages of the data processing apparatus according to the disclosure that have been described above.

The gateway may be designed to take information received from the respective slave as a basis for determining whether the respective slave is in the operational state.

The gateway may be designed to take information received from the host processor as a basis for determining for which of the slaves from the multiple slaves a respective control signal, from the multiple control signals, received from the host processor is intended.

This affords the advantage that not all of the channels or slaves connected to the gateway need to be synchronized, but rather measurement groups of more synchronous slaves can be formed within the gateway.

The gateway may have a memory for temporarily storing the control signals received from the host processor. Depending on demands on functional safety, this memory may be protected by an error correction method (e.g. ECC, error correction code).

The gateway may be designed to receive a further control signal from the host processor. The gateway may be designed to simultaneously output the control signals received from the host processor to the slaves for which the control signal has been received only when all of the slaves for which the control signal has been received are in the operational state and the further control signal has been received at the gateway from the host processor.

The further control signal facilitates the implementation of measurement groups comprising slaves that are controlled by different gateways or are connected to the host processor via different gateways. In detail: in ultrasonic systems, most systems have six or twelve sensors or slaves. The case may now arise in which these sensors are supposed to be actuated via gateways that have a different number of channels from the sensors, e.g. four channels. So that all channels can be synchronized or cross-gateway measurement groups can be produced, the gateways may be designed to be synchronized by the further control signal from the host processor.

The gateway may comprise a first interface for communication with the host processor by means of a first communication standard, a second interface for communication with the sensor by means of a second communication standard, and a memory connected to the first and/or the second interface for the purpose of temporarily storing data that are received at the gateway via the first and/or the second interface. The memory may be protected by means of an error detection method and/or an error correction method.

As already implied by the term gateway, the gateway may thus be a component that is designed to convert data received at the first interface from the host processor according to the first communication standard into the second communication standard, which is different from the first communication standard, and to output the data to the sensor via the second interface, and/or to convert data received at the second interface from the sensor according to the second communication standard into the first communication standard and to output the data to the host processor via the first interface.

The first communication standard may be e.g. SPI (Serial Peripheral Interface and the associated communication or bus protocol) and the second communication standard may be e.g. DSI (Distributed Systems Interface (e.g. having three inputs and outputs, or DSI3) and the associated communication or bus protocol).

The memory may be a buffer memory or a temporary memory in which data of the second communication standard that are received via the second interface are temporarily stored before the data are output from the memory to the first interface and from there to the host processor. This allows the host processor to be relieved of load.

Additionally or alternatively, it may be a buffer memory or a temporary memory in which data of the first communication standard that are received via the first interface are temporarily stored before the data are output from the memory to the second interface and from there to the host processor. It is conceivable for the data of the first communication standard to first be temporarily stored, or buffered, in the memory (known as an SPI command queue in the case of SPI), then output from the memory to a control unit of the gateway for conversion into the second communication standard and temporarily stored in the memory (known as a DSI command queue in the case of DSI) until the data have been completely converted from the first into the second communication standard by the control unit, before the data available in the memory in the second communication standard are output to the second interface and from there to the sensor.

An error correction method, also error correcting code or error checking and correction (ECC), can be understood to mean a method that is used to detect and, if possible, correct errors in the storage and/or transmission (e.g. bit flip) of data. Error detection methods are limited to establishing whether there is an error, e.g. by evaluating a parity bit. To this end, prior to data storage or transmission, additional redundancy is added to the payload data, usually in the form of additional bits, which is used at the destination to detect errors and to determine the error position(s).

The above arrangement affords a series of advantages, as described in detail below.

An increasing level of automation for motor vehicles is increasing a required level of functional safety for single individual systems used or installed in the motor vehicle and a degree of interaction between these individual systems or components.

Functional safety (also abbreviated to FuSa) refers to the part of the safety of a system that is dependent on the correct functioning of the safety-related system and other risk-reducing measures.

To define various requirements in respect of functional safety in motor vehicles, the Automotive Safety Integrity Level (ASIL) exists, which is a risk classification scheme defined in ISO standard 26262—functional safety for road vehicles. This is an adaptation of the safety integrity level (SIL) used in IEC 61508 for the automotive sector. This classification helps to define the safety requirements needed in order to comply with the ISO 26262 standard. The ASIL is determined by performing a risk analysis for a potential hazard, taking account of the severity, exposure and controllability of the vehicle operating scenario. The safety aim for this hazard again includes the ASIL requirements.

The standard makes a distinction between four ASILs: ASIL A, ASIL B, ASIL C, ASIL D. ASIL D makes the highest integrity demands on the product, ASIL A the lowest. Hazards denoted as QM have no safety requirements.

Gateways should also meet FuSa requirements. In automotive engineering, gateways can often be found between the different data buses, such as CAN in different speed versions, e.g. MOST bus. A typical configuration in an automobile consists of a "fast" CAN bus for engine control and similar realtime control units and a "slow" CAN bus for control units having few and rarely occurring data ("additional-feature bus", for tyre pressure monitoring or fuel gauges). For certain purposes (e.g. diagnosis and/or control), some data also need to be made available on the respective other bus. For this purpose, the gateway copies the data from one bus to the other. This gateway may act as a separate control unit or may be part of an existing, larger control unit that needs to attend to connections to all bus variants.

In particular in ultrasonic measurement systems used e.g. for a parking aid, but also in other sensors of a motor vehicle, a signal that is output by the sensor is transmitted to a host processor via a gateway and a control signal is transmitted from the host processor to the sensor via the gateway. The gateway ensures compatibility between two different communication standards in this case, i.e. a first communication standard, which the sensor uses to communicate with the gateway, and a second communication standard, which the host processor uses to communicate with the gateway. In other words, the gateway "translates" from the first to the second communication standard, and vice versa, with the result that the sensor can communicate with the host processor, and vice versa. In order for this system comprising the host processor, the gateway and the sensor to meet ASIL requirements, it may be necessary for the gateway itself to meet ASIL requirements.

As a result of the memory being protected by means of an error detection method and/or an error correction method, data corruption of data that are stored, in particular temporarily buffered, in the memory can be prevented or detected during, in particular also bidirectional, communication via the gateway. This allows specific aims in regard to functional safety to be achieved, such as e.g. a required ASIL level (optionally ASIL B).

The first interface may be designed to generate a first error correction code on the basis of data received at the first interface and to output the generated first error correction code to the memory together with the data received at the first interface. Additionally or alternatively, the second interface may be designed to take data received at the second interface as a basis for generating a second error correction code and to output the generated second error correction code to the memory together with the data received at the second interface.

An error correction code or error correcting code (ECC) can be understood to mean a coding for error correction that, in contrast to a parity check, is capable of correcting a 1-bit error and of detecting a 2-bit error. The ECC method requires e.g. 6 check bits for 32 bits and 7 check bits for 64 bits. The generated error correction code means these check bits. In detail: in IT, telecommunications, information theory and coding theory, an error correction code (ECC) is used to monitor data errors via unreliable or noisy communication channels. The central concept is that the transmitter codes the message with redundant information in the form of an ECC. The redundancy allows the receiver to detect a limited number of errors, which can occur anywhere in the message, and to correct these errors often without fresh transmission. ECC differs from error detection in so far as errors that have occurred can be corrected and not only detected. The advantage is that a system that uses ECC requires no return channel to request a fresh transmission of data when an error occurs.

The memory may be designed to use the first error correction code received at the memory to detect, and optionally correct, an error in the data received from the first interface. Additionally or alternatively, the memory may be designed to use the second error correction code received at the memory to detect, and optionally correct, an error in the data received from the second interface.

The memory may be designed to output the received first error correction code to the second interface together with the data received from the first interface. The second interface may be designed to use the first error correction code received at the second interface to detect, and optionally correct, an error in the data received at the second interface from the memory. Additionally or alternatively, the memory may be designed to output the received second error correction code to the first interface together with the data received from the second interface. The first interface may be designed to use the second error correction code received at the first interface to detect, and optionally correct, an error in the data received at the first interface from the memory.

The gateway may have a control unit that is connected to the first and/or the second interface via the memory. The memory may be designed to output the received first error correction code to the second interface via the control unit together with the data received from the first interface. The control unit may be designed to use the first error correction code received at the control unit to detect, and optionally correct, an error in the data received at the control unit from the memory.

The first interface may be designed to check the data received at the first interface by means of a cyclic redundancy check. Additionally or alternatively, the second interface may be designed to check the data received at the second interface by means of a cyclic redundancy check.

The cyclic redundancy check (CRC) is a method for determining a check value for data in order to be able to detect errors during transmission and/or storage. Prior to data storage and/or transmission, additional redundancy in the form of what is known as a CRC value can be appended for each data block of the payload data. The CRC value is a check value that has been calculated using a specific method and that can be used to detect any errors that have occurred during storage or transmission. The data are examined by applying the same calculation method to the data block, including the appended CRC value. If the result is then zero, it can be assumed that the data block is genuine. Various technical applications deviate from this scheme, however, for example by initializing the calculation with a specific value or inverting the CRC value prior to transmission. This is also covered by the disclosure.

The disclosure also relates to a system for data processing, comprising the gateway described above, a host processor, connected to the gateway, that is designed to output the multiple control signals, each comprising the at least one control signal for a particular predetermined slave from the multiple slaves, to the gateway, and multiple slaves connected to the gateway, the gateway and the slaves being organized in a P2P topology, with the result that the gateway has an independent channel for each of the slaves.

The host processor may be an electronic control unit (ECU). The electronic control unit may be an intelligent processor-controlled unit that can communicate with other modules e.g. via the gateway, optionally embodied as a central gateway (CGW), and that may possibly form the vehicle electrical system by way of field buses, such as the CAN bus, LIN bus, MOST bus, FlexRay, DSI and/or by way of automotive Ethernet, e.g. together with telematics control units and/or an environment sensor system having a single or multiple sensor(s). It is conceivable for the control unit to control functions relevant to the driving behavior of the motor vehicle, such as engine control, force transmission, the braking system, a steering system and/or the tire pressure monitoring system. Moreover, driver assistance systems, such as for example a park assist system, adaptive cruise control (ACC), a lane departure warning system, a lane change assist system, a road sign recognition system, a traffic light detection system, a hill-start assist system, a night vision assist system, a park assist system and/or a junction assist system, can be controlled by the control unit.

The slaves may each be designed to output to the gateway the information on the basis of which the gateway can determine whether the respective slave is in the operational state.

The host processor may be designed to output to the gateway the information on the basis of which the gateway can determine for which of the slaves from the multiple slaves a respective control signal, received from the host processor, from the multiple control signals is intended.

The host processor may be designed to output the further control signal to the gateway.

The disclosure also relates to a motor vehicle, comprising the gateway described above or the system for data processing described above.

The motor vehicle may be a motor car, such as an automobile, a motorized two- or three-wheeled vehicle, and/or a commercial vehicle, such as a truck.

The motor vehicle may be automated. The motor vehicle may be designed to undertake longitudinal guidance and/or lateral guidance during automated driving of the motor vehicle, at least in part and/or at least intermittently.

Automated driving can take place in such a way that the motor vehicle moves (largely) autonomously. Automated driving can be controlled at least in part and/or intermittently by the gateway or the system for data processing.

The motor vehicle may be an autonomy level 1 motor vehicle, i.e. may have specific driver assistance systems that assist the driver in vehicle operation, such as for example adaptive cruise control (ACC).

The motor vehicle may be an autonomy level 2 motor vehicle, i.e. may be semiautomated such that functions such as automatic parking, keeping in lane or lateral guidance, general longitudinal guidance (in particular starting off), acceleration and/or braking can be undertaken by driver assistance systems.

The motor vehicle may be an autonomy level 3 motor vehicle, i.e. may be conditionally automated such that the driver does not need to constantly monitor the vehicle system. The motor vehicle automatically performs functions such as triggering the turn signal, changing lane and/or keeping in lane. The driver can turn to other things, but if need be is called upon by the system to take over guidance within an advance warning period.

The motor vehicle may be an autonomy level 4 motor vehicle, i.e. may be highly automated such that guidance of the vehicle is permanently undertaken by the vehicle system. If the driving tasks can no longer be managed by the system, the driver can be called upon to take over guidance.

The motor vehicle may be an autonomy level 5 motor vehicle, i.e. may be fully automated such that the driver is not required to perform the driving task. Apart from stipulating the destination and starting the system, no human intervention is necessary. The motor vehicle does not require a steering wheel or pedals.

The above description relating to the gateway and the system for data processing also applies, mutatis mutandis, to the motor vehicle, and vice versa.

The disclosure also relates to a method for operating the gateway described above. The method comprises receiving multiple control signals, each comprising at least one control signal for a particular predetermined slave from the multiple slaves, at the gateway from the host processor, determining whether the slaves for which the at least one control signal has been received are in an operational state, and simultaneously outputting the control signals received from the host processor to the slaves for which the at least one control signal has been received only when all of the slaves for which the at least one control signal has been received are in the operational state.

The method may be a computer-implemented method, i.e. one, multiple or all step(s) of the method may be carried out at least in part by a computer, or an apparatus for data processing, or a data processing apparatus.

The method may comprise protecting data received by means of the first and/or the second interface by means of an error detection method and/or an error correction method at the first interface, the second interface and/or the memory.

The above description relating to the gateway, the system for data processing and the motor vehicle also applies, mutatis mutandis, to the method, and vice versa.

A computer program, comprising commands that, when the program is executed by a computer, cause the computer to carry out at least part of the method described above, is also provided.

A program code of the computer program may be present in any code, in particular in a code that is suitable for controllers of motor vehicles.

The computer may be the gateway described above or the system for data processing described above.

The above description relating to the gateway, the system for data processing, the motor vehicle and the method also applies, mutatis mutandis, to the computer program, and vice versa.

A computer-readable medium, in particular a computer-readable storage medium, that comprises at least part of the computer program described above is also provided.

That is to say that a computer-readable medium may be provided that comprises a computer program as defined above. The computer-readable medium may be any digital data storage unit, such as for example a USB stick, a hard disk, a CD-ROM, an SD card or an SSD card.

The computer program does not necessarily have to be stored on such a computer-readable storage medium in order to be made available to the motor vehicle, but rather may also be obtained externally via the Internet or elsewhere.

The computer-readable medium may comprise commands that, when the commands are executed by a computer, optionally the gateway described above and/or the system for data processing described above, cause the computer to carry out at least part of the method described above.

The above description relating to the gateway, the system for data processing, the motor vehicle, the method and the computer program also applies, mutatis mutandis, to the computer-readable medium, and vice versa.

BRIEF DESCRIPTION OF THE DRAWINGS

An optional embodiment is described below with reference to FIGS. 1 to 5.

DESCRIPTION OF EXEMPLARY EMBODIMENTS

Figure 1:
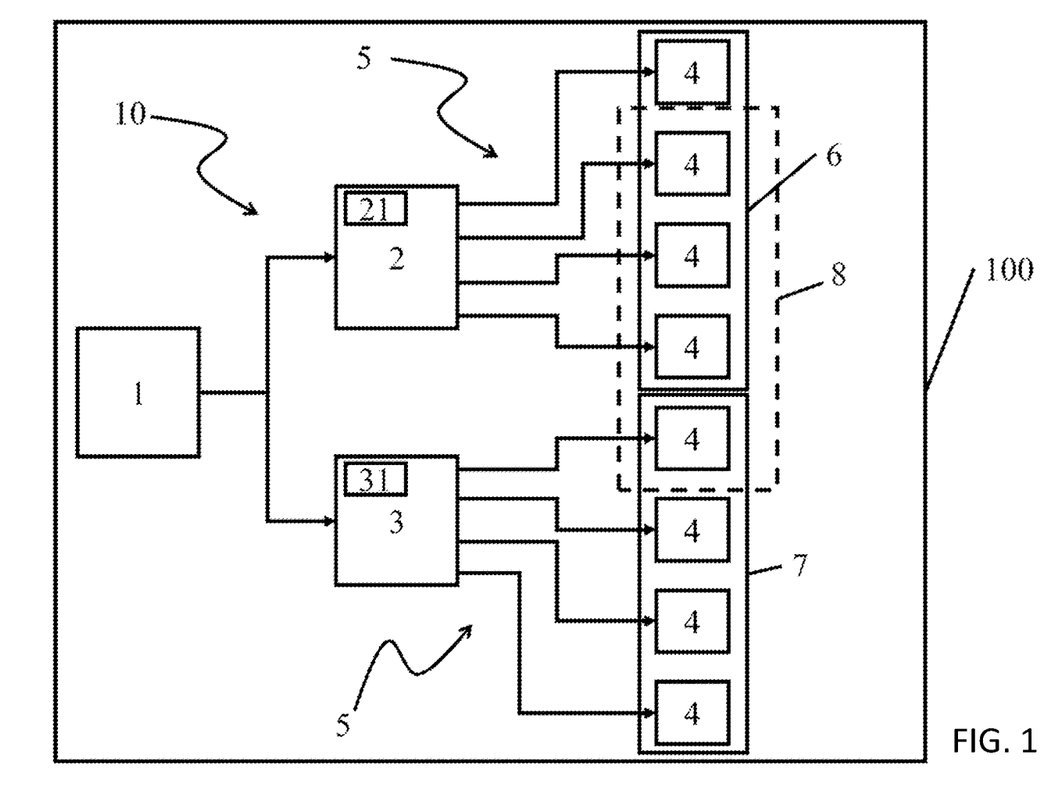
FIG. 1 schematically shows a system for data processing having a gateway according to the disclosure, FIG. 2 schematically shows a flowchart of a method for operating the system for data processing from FIG. 1, FIG. 3 schematically shows a gateway according to the disclosure, which is part of the system for data processing from FIG. 1, in a first state, in which data from a host processor are transmitted to a sensor via the gateway, FIG. 4 schematically shows the gateway according to the disclosure, which is part of the system for data processing from FIG. 1, in a second state, in which data from the sensor are transmitted to the host processor via the gateway, and FIG. 5 schematically shows a flowchart of a further method according to the disclosure for operating the system for data processing shown in FIG. 1, in particular the gateway shown in FIGS. 3 and 4.

The system for data processing 10 shown in FIG. 1 has a host processor 1, two gateways 2, 3 and, for each gateway, four slaves 4 embodied as (ultrasonic) sensors. The host processor 1 is connected via the gateways 2, 3, which are connected to the respective gateway 2, 3 by means of a P2P bus topology, i.e. via independent channels 5. The sensors can be split into a first group 6 and a second group 7, regardless of the gateway 2, 3 to which they are connected. The system for data processing is part of a motor vehicle 100.

Figure 2:
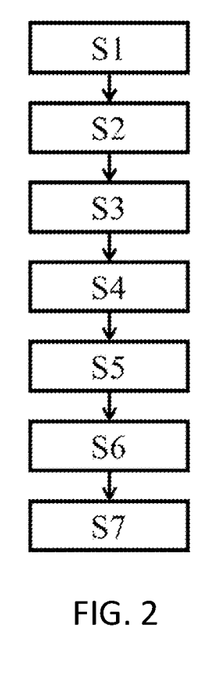

The system for data processing 10 is designed to carry out the method that is also described with reference to FIG. 2 below.

In a first step S1 of the method, the host processor 1 outputs multiple control signals, each comprising at least one control signal for a particular predetermined slave 4 from the multiple slaves 4 and information about for which slave 4 the respective control signal is intended, from the host processor 1 to the gateways 2, 3.

In a second step S2 of the method, the gateways 2, 3 each determine for which of the slaves 4 the respective received control signal is intended and accordingly file the respective control signal in a memory 21, 31 of the gateway 2, 3 for temporarily storing the control signals received from the host processor 1. This is effected on the basis of the information contained in the control signals that is received at the respective gateway 2, 3 from the host processor 1 together with the control signals.

In a third step S3 of the method, the slaves 4 each output information about the respective channel 5 to the respective gateway 2, 3 to which they are connected, the information signalling that the respective slave 4 is in an operational state.

In a fourth step S4 of the method, the gateways 2, 3 each take the information received from the respective slave 4 as a basis for determining whether the respective slave 4 is in the operational state. The first gateway 2 does this for the first group 6 of slaves 4 and the second gateway 3 does this for the second group 7 of slaves 4. It is conceivable for the respective gateway 2, 3 to output a signal to the host processor 1 as soon as the slaves 4 connected to the respective gateway 2, 3 are operational.

In a fifth step S5 of the method, the host processor 1 outputs a further control signal to the gateways 2, 3 that signals to the gateways 2, 3 that the slaves 4 of the respective other gateway 2, 3 are also operational and that the control signals deposited in the respective memory 21, 31 are supposed to be output to the respective group 6, 7 of slaves 4.

In a sixth step S6 of the method, when the gateways 2, 3 have each established both that the slaves 4 for which the control signals in the respective (temporary) memory 21, 31 are intended are operational and that the further control signal has been received at the respective gateway 2, 3 from the host processor, the gateways simultaneously output the control signals deposited in the respective memory 21, 31 to the slaves 4 for which the respective control signals are intended.

The slaves 4 in both groups 6, 7 that receive the applicable control signal from the gateway 2, 3 to which they are connected then essentially simultaneously output an ultrasonic signal in a seventh step S7 of the method.

The above method therefore affords essentially two advantages. First, the slaves 4 that are connected to the same gateway via the P2P topology can be time-synchronized. In addition, the slaves 4 that are connected to different gateways 2, 3 (in this regard see groups 6, 7 above) can also be time-synchronized. It will be noted that not all of the slaves 4 that are connected to the same gateway 2, 3 must belong to a single group, i.e. not all of the slaves 4 of a gateway 2, 3 have to simultaneously output an (ultrasonic) signal. Rather, the method also affords a third advantage, which results from a combination of the two aforementioned advantages. To be more precise, this third advantage is that the slaves 4 of different gateways 2, 3 are able to be time-synchronized to one another in any way despite the P2P topology, as is intended to be symbolized by the group 8 indicated by a dashed line in FIG. 1.

An optional arrangement of the gateways 2, 3 and the operation thereof will be described more thoroughly in detail below with reference to FIGS. 3 to 5, only one of the gateways 2, 3 being shown and described there by way of illustration. The description applies to both gateways 2, 3 equally, however.

As already described above, the gateway 2, 3 is connected both to the host processor 1 and to the sensors 4 (only one of the sensors being shown in FIGS. 3 and 4 by way of illustration) in such a way that bidirectional (data) communication between the host processor 1 and the sensor 4 is possible via the gateway 2, 3.

Figure 3:
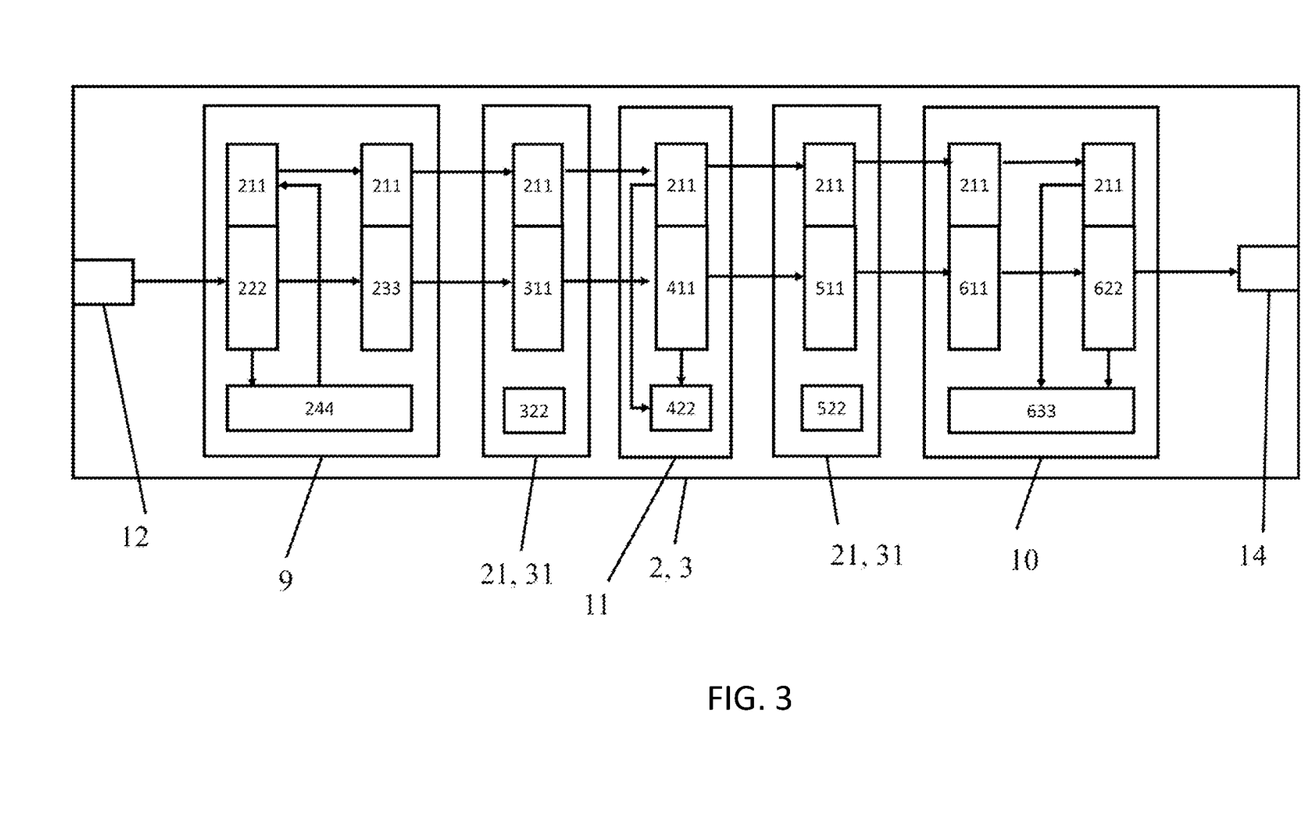
Figure 4:
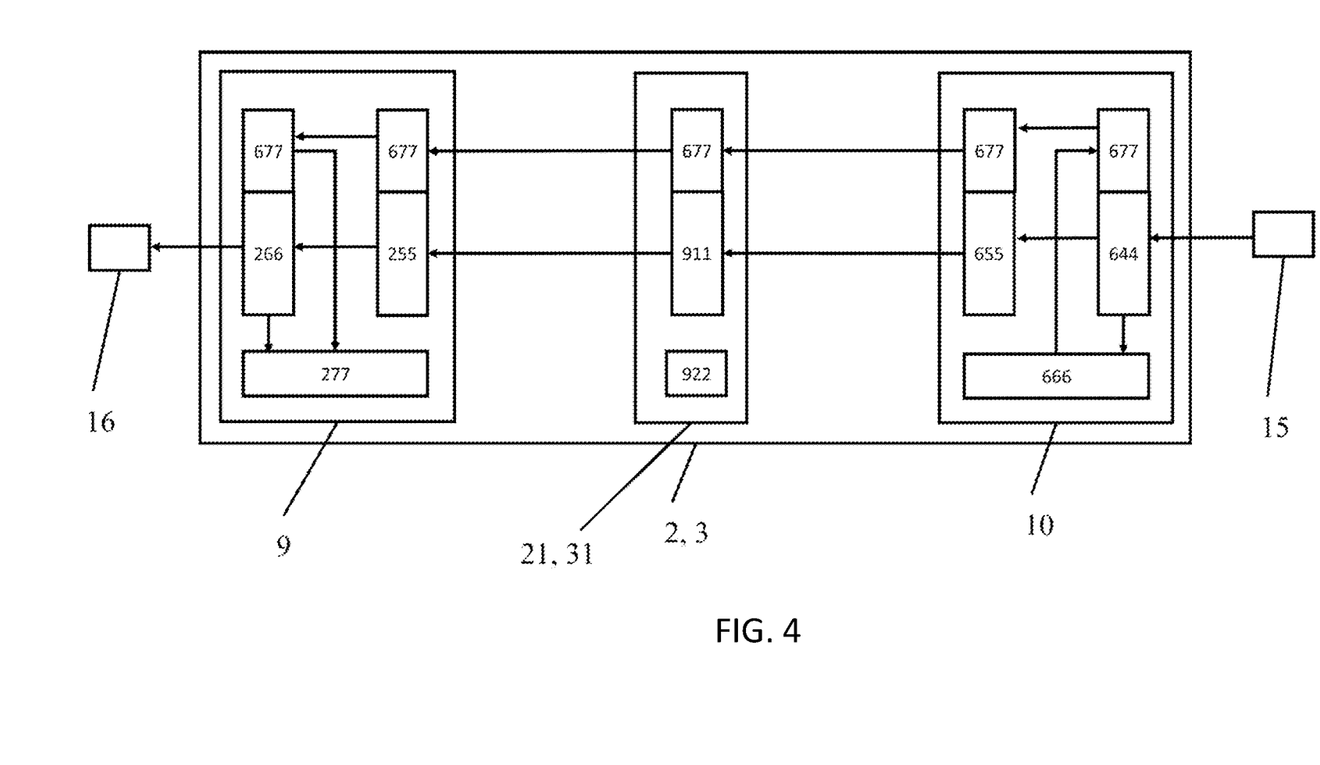
Figure 5:
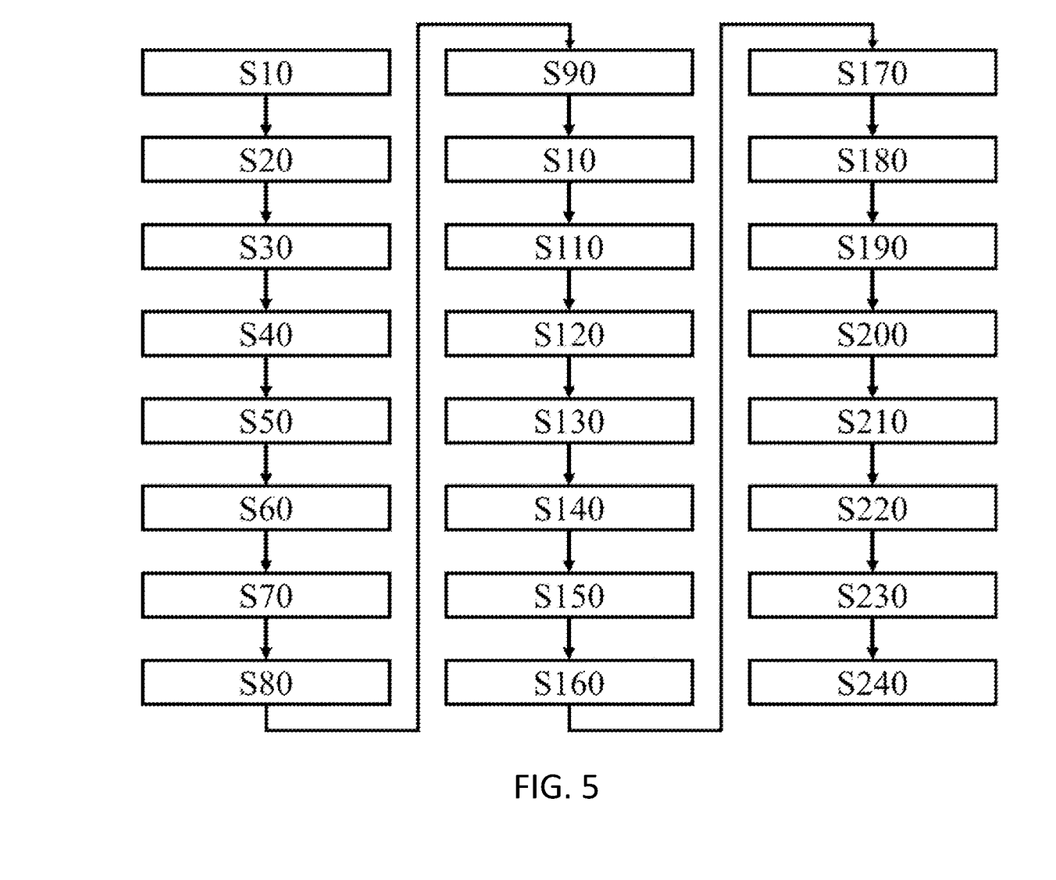

The gateway 2, 3 shown more thoroughly in detail in FIGS. 3 and 4 comprises a first pin 12, which is embodied as a Master-Out Slave-In (MOSI) pin, a first interface 9, which is embodied as an SPI interface here, the (buffer) memory 21, 31 (see FIG. 1), which is embodied as a RAM (Random Access Memory) in the present case, with multiple memory areas 311, 511, 911, a control unit 11, a second interface 10, which is embodied as a DSI interface here, a second pin 14, which is embodied as a DSI Output pin, a third pin 15, which is embodied as a DSI Input pin, and a fourth pin 16, which is embodied as a Master-In Slave-Out (MISO) pin.

The gateway 2, 3 is connected to the host processor 1 via the SPI interface 9 of the gateway and designed to communicate bidirectionally with the host processor 1 by means of a first communication standard, here the SPI communication standard.

The SPI interface 9, which is connected to the MOSI pin 12 and to the MISO pin 16, comprises a register 222, which is embodied as an MOSI register, a module for a cyclic redundancy check 233, which is embodied as an SPI CRC checker, a module 244 for generating an error correction code (ECC) 211 on the basis of data stored or located in the MOSI register 222 that have been received from the host processor 1 via the MOSI pin 12, which is embodied as an ECC encoder, a module for generating a code for a cyclic redundancy check 255 on the basis of data received from the memory area 911, which is embodied as an SPI CRC generator, a register 266, which is embodied as an MISO register, and a module 277 for examining an ECC 677, which is embodied as an ECC decoder.

The memory 21, 31 connected to the SPI and DSI interfaces is used for temporarily storing data that are received at the gateway 2, 3 via the SPI and DSI interfaces, the memory 21, 31 being protected by means of an error correction method. The memory areas 311, 511, 911 are therefore each connected to a module 322, 522, 922 for examining the ECC 211 or ECC 677, which is embodied as a RAM ECC checker.

A RAM ECC checker may be designed to check the received ECC 211 or 677. A RAM ECC checker 322, 522, 922 may be designed to use the data received at the memory 21, 31 and a memory address at which the data are supposed to be filed to form an ECC and to store it together with the data. A RAM ECC checker 322, 522, 922 may also be designed to check the stored ECC during read access to the data and then to use the data to again form an ECC 211, 677, which is then output with the data.

The control unit 11 (also referred to as main control), which is connected to the SPI and DSI interfaces 9, 10 via the memory, comprises a control module 411, which is embodied as a command control, and a module 422 for examining the ECC 211, which is embodied as an ECC decoder. The command control 411 may be configured to determine for which unit (e.g. for which sensor 4 or for the gateway 2, 3 itself) data received from the host processor 1 are intended and to cause the data to be forwarded to the specific unit.

The gateway 2, 3 is connected to the sensor 4 via the DSI interface 10 of the gateway and designed to communicate bidirectionally with the sensor 4 by means of a second communication standard, here the DSI communication standard.

The DSI interface 10, which is connected to the DSI Output pin 14 and the DSI Input pin 15, comprises a module for generating a code for a cyclic redundancy check 611 on the basis of the data received from the memory area 511, which is embodied as a DSI CRC generator, a register 622, which is embodied as a DSI Tx register, a module 633 for examining the ECC 211, which is embodied as an ECC decoder, a register 644, which is embodied as a DSI Rx register, a module for a cyclic redundancy check 655, which is embodied as a DSI CRC checker, and a module 666 for generating the ECC 677 on the basis of data stored or located in the DSI Rx register 644 that have been received from the sensor 4 via the DSI Input pin 15, which is embodied as an ECC encoder.

The gateway 2, 3 is therefore designed to be operated according to the method that is also described with reference to FIG. 5 below.

The first fourteen steps S10-S140 described below correspond to the representation of the gateway 2, 3 in FIG. 3. Steps S150-S240, which are described subsequently, correspond to the representation of the gateway 2, 3 in FIG. 4. In both representations, the part of the gateway 2, 3 that is relevant to the respective communication direction is thus shown (and the irrelevant part is omitted). As a person skilled in the art is aware, the form of representation chosen in FIGS. 3 and 4 for the components of the gateway 2, 3 is schematic insofar as an actual physical arrangement of the individual components may deviate therefrom provided that the gateway 2, 3 is designed to carry out the method described below. One example that will be mentioned is the representation of the memory 21, 33, which may be embodied as a physical memory (chip) but is not shown as a coherent unit here for the purposes of explanation. Another example that will be mentioned is the memory areas 311, 511, 911, which may certainly be embodied as physically separate areas in the memory 21, 31, whereas this is not necessary, however, and other solutions are also conceivable.

In a first step S10 of the method, the host processor 1 uses the SPI communication standard to send first data via the MOSI pin 12 to the SPI interface 9, in which the first data obtained are temporarily buffered in the MOSI register 222.

In a second step S20 of the method, the ECC encoder 244 takes the first data contained in the MOSI register 222 as a basis for generating the ECC 211.

In a third step S30 of the method, the SPI CRC checker 233 subjects the first data contained in the MOSI register 222 to a cyclic redundancy check on the basis of a CRC, which has optionally been generated by the host processor 1, contained in the first data.

In a fourth step S40 of the method, the SPI interface 9 forwards or outputs the CRC-checked first data to the memory area 311 of the RAM 21, 31 together with the ECC 211.

In a fifth step S50 of the method, the RAM ECC checker 322 uses the ECC 211 to check whether there is an error in the data received from the SPI interface 9 and corrects the error if it exists and this is possible.

In general, it will be noted that an error that is detected in the course of the method and cannot be corrected may lead to termination of the method and/or to the erroneous or corrupt data being re-requested.

In a sixth step S60 of the method, the data temporarily buffered in the memory area 311 and checked by means of the RAM ECC checker 322 are output to the command control 411 of the control unit 11 together with the ECC 211.

In a seventh step S70 of the method, the ECC decoder 422 of the control unit 11 examines the received ECC 211 on the basis of the data received at the command control 411 from the memory area 311, in order to check whether there is an error in the data received from the memory area 311, and corrects the error if it exists and this is possible.

In an eighth step S80 of the method, the control unit 11 outputs the data checked by means of the ECC decoder 422 to the memory area 511 of the memory 21, 31.

In a ninth step S90 of the method, the RAM ECC checker 522 uses the ECC 211 to check whether there is an error in the data received from the control unit 11 and corrects the error if it exists and this is possible.

In a tenth step S100 of the method, the data temporarily stored in the memory area 511 and checked by means of the RAM ECC checker 522 are output to the DSI CRC generator 611 of the DSI interface 10 together with the ECC 211.

In an eleventh step S110 of the method, the DSI CRC generator 611 generates a CRC on the basis of the data received from the memory area 511 and outputs the data to the DSI Tx register 622 together with the generated CRC and the ECC 211 in a twelfth step S120 of the method.

In a thirteenth step S130 of the method, the ECC decoder 633 of the DSI interface 10 examines the received ECC 211, on the basis of the data temporarily buffered in the DSI Tx register 622, for whether there is an error in the data received from the memory area 511 and corrects the error if it exists and this is possible.

In a fourteenth step S140 of the method, the DSI interface 10 sends the checked data temporarily buffered in the DSI Tx register 622 to the sensor 4 via the DSI Output pin 14, using the DSI communication standard, together with the CRC generated in the eleventh step S110, these transmitted data corresponding to the first data received at the gateway 2, 3 in the first step S10.

Since the complete communication path, as described above with reference to steps S10-S140, from the host processor 1 via the gateway 2, 3 to the sensor 4 is protected (between the host processor 1 and the gateway 2, 3 using CRC, within the gateway 2, 3 using ECC and from the gateway 2, 3 to the sensor 4 again using CRC), it is possible to attain at least ASIL B here.

The communication path from the sensor 4 via the gateway 2, 3 to the host processor 1 is described below. Steps S10-S140 described above can be considered to be a standalone method in this case and steps S150-S240 below can also be considered to be a standalone method, the methods being able to be combined with one another and being able to be carried out in succession and/or, at least in part, simultaneously during operation of the gateway 2, 3.

In a fifteenth step S150 of the method, the sensor 4 uses the DSI communication standard to send second data via the DSI Input pin 15 to the DSI interface 10, in which the second data obtained are buffer-stored in the DSI Rx register 644.

In a sixteenth step S160 of the method, the ECC encoder 666 takes the second data contained in the DSI Rx register 644 as a basis for generating the ECC 677.

In a seventeenth step S170 of the method, the DSI CRC checker 655 subjects the second data contained in the DSI Rx register 644 to a cyclic redundancy check on the basis of a CRC, which has optionally been generated by the sensor 4, contained in the second data.

In an eighteenth step S180 of the method, the DSI interface 10 forwards or outputs the CRC-checked second data to the memory area 911 of the RAM 21, 31 together with the ECC 677.

In a nineteenth step S190 of the method, the RAM ECC checker 922 uses the ECC 677 to check whether there is an error in the data received from the DSI interface 10 and corrects the error if it exists and this is possible.

In a twentieth step S200 of the method, the data temporarily stored in the memory area 911 and checked by means of the RAM ECC checker 922 are output to the SPI CRC generator 255 of the SPI interface 9 together with the ECC 677.

In a twenty-first step S210 of the method, the SPI CRC generator 255 generates a CRC on the basis of the data received from the memory area 911 and outputs the data to the SPI MISO register 267 of the SPI interface 9 together with the generated CRC and the ECC 677 in a twenty-second step S220 of the method.

In a twenty-third step S230 of the method, the ECC decoder 277 of the SPI interface 9 examines the received ECC 677, on the basis of the data temporarily buffered in the SPI MISO register 266, for whether there is an error in the data received from the memory area 911 and corrects the error if it exists and this is possible.

In a twenty-fourth step S240 of the method, the SPI interface 9 sends the checked data temporarily buffered in the MISO register 266 to the host processor 1 via the MISO pin 16, using the SPI communication standard, together with the CRC generated in the twenty-first step S210, these transmitted data corresponding to the second data received at the gateway 2, 3 in the fifteenth step S150.

Since, here too, the complete communication path, as described above with reference to steps S150-S240, from the sensor 5 via the gateway 2, 3 to the host processor 1 is protected (between the host processor 1 and the gateway 2, 3 using CRC, within the gateway 2, 3 using ECC and from the sensor 4 to the gateway 2, 3 again using CRC), it is possible to attain at least ASIL B here.

The advantages described above can thus be achieved because the method comprises protecting data received by means of the first and the second interface by means of an error correction method and/or an error detection method at the first interface 9, the second interface 10 and the memory 21, 31 and also the control unit 11.

LIST OF REFERENCE SIGNS 1 host processor
2 first gateway
21 (buffer) memory of the first gateway, optionally RAM
3 gateway
31 (buffer) memory of the second gateway, optionally RAM
4 slaves, optionally sensor 5 channels
6 first group of slaves
7 second group of slaves
8 possible additional or alternative group of slaves
9 SPI interface
10 system for data processing
11 control unit or main control
12 Master-Out Slave-In (MOSI) pin
14 DSI Output pin
15 DSI Input pin
16 Master-In Slave-Out (MISO) pin
100 motor vehicle
211 ECC
222 MOSI register
233 SPI CRC checker
244 ECC encoder
255 SPI CRC generator
266 MISO register
277 ECC decoder
311 first memory area
322 RAM ECC checker
411 control module or command control
422 ECC decoder
511 second memory area
522 RAM ECC checker
10 DSI interface
611 DSI CRC generator
622 DSI Tx register
633 ECC encoder
644 DSI Rx register
655 DSI CRC checker
665 ECC encoder
677 ECC
911 third memory area
922 RAM ECC checker
S1-S7 method steps of the first method
S10-S240 method steps of the second method

The invention claimed is:

1. A gateway for connection to a host processor and multiple slaves, the gateway and the slaves being organized in a point-to-point (P2P) topology such that the gateway has an independent channel for each of the slaves, the gateway being configured to:
receive multiple control signals, each control signal including at least one control signal for a particular predetermined slave from the multiple slaves, from the host processor;
determine whether the slaves for which the at least one control signal has been received are in an operational state; and
simultaneously output the control signals received from the host processor to the slaves for which the at least one control signal has been received only when all of the slaves for which the at least one control signal has been received are in the operational state, wherein the gateway comprises:
a first interface for communication with the host processor by means of a first communication standard;
a second interface for communication with the slaves by means of a second communication standard; and
a memory connected to the first and/or to the second interface for the purpose of temporarily storing data that are received at the gateway via the first and/or the second interface,
wherein the memory is protected by means of an error detection method and/or an error correction method.

2. The gateway as claimed in claim 1, wherein
the first interface is configured to generate a first error correction code based on data received at the first interface and to output the generated first error correction code to the memory together with the data received at the first interface, and/or
the second interface is configured to take data received at the second interface as a basis for generating a second error correction code and to output the generated second error correction code to the memory together with the data received at the second interface.

3. The gateway as claimed in claim 2, wherein
the memory is configured to use the first error correction code received at the memory to detect, and optionally correct, an error in the data received from the first interface, and/or
the memory is configured to use the second error correction code received at the memory to detect, and optionally correct, an error in the data received from the second interface.

4. The gateway as claimed in claim 2, wherein
the memory is configured to output the received first error correction code to the second interface together with the data received from the first interface, and the second interface is configured to use the first error correction code received at the second interface to detect, and optionally correct, an error in the data received at the second interface from the memory, and/or
the memory is configured to output the received second error correction code to the first interface together with the data received from the second interface, and the first interface is configured to use the second error correction code received at the first interface to detect, and optionally correct, an error in the data received at the first interface from the memory.

5. The gateway as claimed in claim 4, wherein
the gateway has a control unit that is connected to the first and/or the second interface via the memory,
the memory is configured to output the received first error correction code to the second interface via the control unit together with the data received from the first interface, and
the control unit is configured to use the first error correction code received at the control unit to detect, and optionally correct, an error in the data received at the control unit from the memory.

6. A method for operating a gateway for connection to a host processor and multiple slaves, the gateway and the slaves being organized in a point-to-point (P2P) topology such that the gateway has an independent channel for each of the slaves, the gateway being configured to:
receive multiple control signals, each control signal including at least one control signal for a particular predetermined slave from the multiple slaves, from the host processor;
determine whether the slaves for which the at least one control signal has been received are in an operational state; and
simultaneously output the control signals received from the host processor to the slaves for which the at least one control signal has been received only when all of the slaves for which the at least one control signal has been received are in the operational state, wherein the gateway includes:
a first interface for communication with the host processor by means of a first communication standard;

a second interface for communication with the slaves by means of a second communication standard; and a memory connected to the first and/or to the second interface for the purpose of temporarily storing data that are received at the gateway via the first and/or the second interface, wherein the memory is protected by means of an error detection method and/or an error correction method, the method comprising:

receiving multiple control signals, each comprising at least one control signal for a particular predetermined slave from the multiple slaves, at the gateway from the host processor;

determining whether the slaves for which the at least one control signal has been received are in an operational state;

simultaneously outputting the control signals received from the host processor to the slaves for which the at least one control signal has been received only when all of the slaves for which the at least one control signal has been received are in the operational state; and protecting data received by means of the first and/or the second interface by means of an error detection method and/or an error correction method at the first interface, the second interface and/or the memory.

* * * * *